(12) United States Patent
Griffin et al.

(10) Patent No.: US 7,451,477 B2
(45) Date of Patent: Nov. 11, 2008

(54) SYSTEM AND METHOD FOR RULE-BASED ENTITLEMENTS

(75) Inventors: Philip B. Griffin, Longmont, CO (US); Manish Devgan, Bloomfield, CO (US); Jason Howes, Cambridge, MA (US); Scott Dunbar, Superior, CO (US)

(73) Assignee: BEA Systems, Inc., San Jose, CA (US)

( * ) Notice: Subject to any disclaimer, the term of this patent is extended or adjusted under 35 U.S.C. 154(b) by 728 days.

(21) Appl. No.: 10/279,564

(22) Filed: Oct. 24, 2002

(65) Prior Publication Data

US 2003/0105974 A1 Jun. 5, 2003

Related U.S. Application Data

(60) Provisional application No. 60/386,487, filed on Oct. 24, 2001.

(51) Int. Cl.
*G06F 7/04* (2006.01)
*H04L 9/32* (2006.01)
*G06F 15/16* (2006.01)
*G06F 17/30* (2006.01)

(52) U.S. Cl. ............... 726/1; 726/6; 726/8; 726/28

(58) Field of Classification Search ............ 726/1, 726/6, 8, 28
See application file for complete search history.

(56) References Cited

U.S. PATENT DOCUMENTS

| | | |
|---|---|---|
| 5,173,939 A | 12/1992 | Abadi et al. |
| 5,237,614 A | 8/1993 | Weiss |
| 5,335,345 A | 8/1994 | Frieder et al. |
| 5,347,653 A | 9/1994 | Flynn et al. |
| 5,355,474 A | 10/1994 | Thuraisngham et al. |
| 5,369,702 A | 11/1994 | Shanton ............... 713/166 |
| 5,426,747 A | 6/1995 | Weinreb et al. |
| 5,481,700 A | 1/1996 | Thuraisingham |
| 5,544,322 A | 8/1996 | Cheng et al. |
| 5,557,747 A | 9/1996 | Rogers et al. |
| 5,627,886 A | 5/1997 | Bowman |
| 5,649,195 A | 7/1997 | Scott et al. |
| 5,757,669 A | 5/1998 | Christie et al. |
| 5,758,355 A | 5/1998 | Buchanan |
| 5,797,128 A | 8/1998 | Birnbaum |
| 5,825,883 A | 10/1998 | Archibald et al. |

(Continued)

FOREIGN PATENT DOCUMENTS

EP        697662 A1 *   2/1996

(Continued)

OTHER PUBLICATIONS

Howes, T. "The String Representation of LDAP Search Filters", Dec. 1997 (RFC 2254).*

(Continued)

*Primary Examiner*—Michael J Simitoski
(74) *Attorney, Agent, or Firm*—Fliesler Meyer LLP

(57) ABSTRACT

A system and method of authorization comprising associating at least one role with a resource, associating at least one capability with the at least one role, and determining whether to permit a resource operation based on the at least one capability.

80 Claims, 2 Drawing Sheets

U.S. PATENT DOCUMENTS

| | | | |
|---|---|---|---|
| 5,826,000 A | 10/1998 | Hamilton | |
| 5,826,268 A | 10/1998 | Schaefer et al. | |
| 5,838,909 A | 11/1998 | Roy et al. | |
| 5,848,396 A | 12/1998 | Gerace | 705/10 |
| 5,867,667 A | 2/1999 | Butman et al. | |
| 5,872,928 A | 2/1999 | Lewis et al. | |
| 5,889,953 A | 3/1999 | Thebaut et al. | |
| 5,911,143 A * | 6/1999 | Deinhart et al. | 707/103 R |
| 5,918,210 A | 6/1999 | Rosenthal et al. | |
| 5,925,126 A | 7/1999 | Hsieh | |
| 5,941,947 A | 8/1999 | Brown et al. | |
| 5,950,195 A | 9/1999 | Stockwell et al. | |
| 5,954,798 A | 9/1999 | Shelton et al. | |
| 5,956,400 A | 9/1999 | Chaum et al. | |
| 5,956,719 A | 9/1999 | Kudo et al. | |
| 5,966,707 A | 10/1999 | Van Huben et al. | |
| 5,987,469 A | 11/1999 | Lewis et al. | |
| 5,987,611 A | 11/1999 | Freund | |
| 5,991,735 A | 11/1999 | Gerace | |
| 5,991,877 A | 11/1999 | Luckenbaugh | |
| 6,005,571 A | 12/1999 | Pachauri | |
| 6,006,194 A | 12/1999 | Merel | |
| 6,006,265 A | 12/1999 | Rangan et al. | |
| 6,009,410 A | 12/1999 | Lemole et al. | |
| 6,026,433 A | 2/2000 | D'Arlach et al. | |
| 6,029,144 A | 2/2000 | Barrett et al. | |
| 6,029,182 A | 2/2000 | Nehab et al. | 715/523 |
| 6,029,196 A | 2/2000 | Lenz | |
| 6,054,910 A | 4/2000 | Tada et al. | |
| 6,055,515 A | 4/2000 | Consentino et al. | |
| 6,055,637 A * | 4/2000 | Hudson et al. | 726/20 |
| 6,058,392 A | 5/2000 | Sampson et al. | 707/6 |
| 6,073,242 A | 6/2000 | Hardy et al. | |
| 6,081,829 A | 6/2000 | Sidana | |
| 6,083,276 A | 7/2000 | Davidson et al. | 717/107 |
| 6,088,679 A | 7/2000 | Barkley | |
| 6,092,083 A | 7/2000 | Brodersen et al. | |
| 6,098,173 A | 8/2000 | Elgressy et al. | |
| 6,105,027 A | 8/2000 | Schneider et al. | |
| 6,108,687 A | 8/2000 | Craig | |
| 6,112,192 A | 8/2000 | Capek | |
| 6,122,647 A | 9/2000 | Horowitz et al. | |
| 6,128,663 A | 10/2000 | Thomas | |
| 6,133,915 A | 10/2000 | Arcuri et al. | |
| 6,141,010 A | 10/2000 | Hoyle | 715/854 |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A | 12/2000 | Austin | 707/10 |
| 6,158,010 A | 12/2000 | Moriconi et al. | |
| 6,161,139 A * | 12/2000 | Win et al. | 709/225 |
| 6,167,407 A | 12/2000 | Nachenberg et al. | |
| 6,167,445 A | 12/2000 | Gai et al. | |
| 6,167,448 A | 12/2000 | Hemphill et al. | |
| 6,169,794 B1 | 1/2001 | Oshimi et al. | |
| 6,170,009 B1 | 1/2001 | Mandal et al. | |
| 6,178,172 B1 | 1/2001 | Rochberger | |
| 6,182,142 B1 | 1/2001 | Win et al. | |
| 6,182,226 B1 | 1/2001 | Reid et al. | 713/201 |
| 6,182,277 B1 | 1/2001 | DeGroot | 717/1 |
| 6,185,587 B1 | 2/2001 | Bernardo et al. | |
| 6,188,399 B1 | 2/2001 | Voas et al. | |
| 6,195,696 B1 | 2/2001 | Baber et al. | |
| 6,202,066 B1 * | 3/2001 | Barkley et al. | 707/9 |
| 6,202,157 B1 | 3/2001 | Brownlie et al. | |
| 6,202,207 B1 | 3/2001 | Donohue | |
| 6,205,466 B1 | 3/2001 | Karp et al. | |
| 6,209,101 B1 | 3/2001 | Mitchem et al. | |
| 6,216,231 B1 | 4/2001 | Stubblebine | |
| 6,226,745 B1 | 5/2001 | Wiederhold | 713/200 |
| 6,233,576 B1 | 5/2001 | Lewis | |
| 6,236,991 B1 | 5/2001 | Frauenhofer et al. | |
| 6,241,608 B1 | 6/2001 | Torango | 463/27 |
| 6,243,747 B1 | 6/2001 | Lewis et al. | |
| 6,253,321 B1 | 6/2001 | Nikander et al. | |
| 6,256,741 B1 | 7/2001 | Stubblebine | |
| 6,260,050 B1 | 7/2001 | Yost et al. | 715/501.1 |
| 6,269,393 B1 | 7/2001 | Yost et al. | 709/201 |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,983 B1 | 9/2001 | Jenkins | |
| 6,285,985 B1 | 9/2001 | Horstmann | 705/14 |
| 6,295,607 B1 | 9/2001 | Johnson | |
| 6,301,613 B1 | 10/2001 | Ahlstrom et al. | |
| 6,304,881 B1 | 10/2001 | Halim et al. | |
| 6,308,163 B1 | 10/2001 | Du et al. | 705/8 |
| 6,317,868 B1 | 11/2001 | Grimm et al. | |
| 6,321,336 B1 | 11/2001 | Applegate et al. | |
| 6,327,594 B1 | 12/2001 | Van Huben et al. | |
| 6,327,618 B1 | 12/2001 | Ahlstrom et al. | |
| 6,327,628 B1 | 12/2001 | Anuff et al. | |
| 6,336,073 B1 | 1/2002 | Ihara et al. | |
| 6,339,423 B1 | 1/2002 | Sampson et al. | |
| 6,341,352 B1 | 1/2002 | Child et al. | |
| 6,353,886 B1 | 3/2002 | Howard et al. | |
| 6,357,010 B1 * | 3/2002 | Viets et al. | 726/4 |
| 6,360,363 B1 | 3/2002 | Moser et al. | |
| 6,377,973 B2 | 4/2002 | Gideon | |
| 6,381,579 B1 | 4/2002 | Gervais et al. | |
| 6,393,474 B1 | 5/2002 | Eichert et al. | |
| 6,397,222 B1 | 5/2002 | Zellweger | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,438,563 B1 | 8/2002 | Kawagoe | |
| 6,449,638 B1 | 9/2002 | Wecker et al. | |
| 6,457,007 B1 | 9/2002 | Kikuchi et al. | |
| 6,460,084 B1 | 10/2002 | Van Horne et al. | |
| 6,460,141 B1 | 10/2002 | Olden | |
| 6,463,440 B1 | 10/2002 | Hind et al. | |
| 6,466,239 B2 | 10/2002 | Ishikawa | |
| 6,473,791 B1 | 10/2002 | Al-Ghosein et al. | |
| 6,477,543 B1 | 11/2002 | Huang et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,519,647 B1 | 2/2003 | Howard et al. | |
| 6,530,024 B1 | 3/2003 | Proctor | |
| 6,539,375 B2 | 3/2003 | Kawasaki | 707/5 |
| 6,542,993 B1 | 4/2003 | Erfani | |
| 6,571,247 B1 | 5/2003 | Danno et al. | 707/100 |
| 6,574,736 B1 * | 6/2003 | Andrews | 726/21 |
| 6,581,054 B1 * | 6/2003 | Bogrett | 707/4 |
| 6,581,071 B1 | 6/2003 | Gustman et al. | |
| 6,584,454 B1 | 6/2003 | Hummel, Jr. et al. | |
| 6,587,849 B1 | 7/2003 | Mason et al. | 707/5 |
| 6,587,876 B1 | 7/2003 | Mahon et al. | |
| 6,615,218 B2 | 9/2003 | Mandal et al. | |
| 6,618,806 B1 | 9/2003 | Brown et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,684,369 B1 | 1/2004 | Bernardo et al. | |
| 6,697,805 B1 | 2/2004 | Choquier et al. | |
| 6,715,077 B1 | 3/2004 | Vasudevan et al. | |
| 6,721,888 B1 | 4/2004 | Liu et al. | |
| 6,732,144 B1 | 5/2004 | Kizu et al. | |
| 6,735,586 B2 | 5/2004 | Timmons | 707/3 |
| 6,735,624 B1 * | 5/2004 | Rubin et al. | 709/219 |
| 6,735,701 B1 | 5/2004 | Jacobson | |
| 6,738,789 B2 | 5/2004 | Multer et al. | |

| | | | |
|---|---|---|---|
| 6,751,657 B1 * | 6/2004 | Zothner | 709/220 |
| 6,751,659 B1 | 6/2004 | Fenger et al. | |
| 6,754,672 B1 | 6/2004 | McLauchlin | 707/104.1 |
| 6,757,698 B2 | 6/2004 | McBride et al. | |
| 6,757,822 B1 | 6/2004 | Feiertag et al. | |
| 6,769,095 B1 | 7/2004 | Brassard et al. | |
| 6,769,118 B2 | 7/2004 | Garrison et al. | |
| 6,772,332 B1 | 8/2004 | Boebert et al. | |
| 6,779,002 B1 | 8/2004 | Mwaura | |
| 6,789,202 B1 | 9/2004 | Ko et al. | |
| 6,792,537 B1 | 9/2004 | Liu et al. | |
| 6,832,313 B1 | 12/2004 | Parker | |
| 6,834,284 B2 | 12/2004 | Acker et al. | |
| 6,854,035 B2 | 2/2005 | Dunham et al. | |
| 6,856,999 B2 | 2/2005 | Flanagin et al. | |
| 6,857,012 B2 | 2/2005 | Sim et al. | |
| 6,865,549 B1 | 3/2005 | Connor | |
| 6,873,988 B2 | 3/2005 | Herrmann et al. | |
| 6,880,005 B1 | 4/2005 | Bell et al. | |
| 6,886,100 B2 * | 4/2005 | Harrah et al. | 726/3 |
| 6,889,222 B1 | 5/2005 | Zhao | |
| 6,901,403 B1 | 5/2005 | Bata et al. | |
| 6,904,454 B2 | 6/2005 | Stickler | |
| 6,917,975 B2 | 7/2005 | Griffin et al. | 709/225 |
| 6,920,457 B2 | 7/2005 | Pressmar | |
| 6,922,695 B2 | 7/2005 | Skufca et al. | |
| 6,931,549 B1 | 8/2005 | Ananda | |
| 6,934,934 B1 | 8/2005 | Osborne et al. | |
| 6,957,261 B2 | 10/2005 | Lortz | |
| 6,961,897 B1 | 11/2005 | Peel et al. | |
| 6,965,999 B2 | 11/2005 | Fox et al. | |
| 6,970,445 B2 | 11/2005 | O'Neill et al. | |
| 6,970,876 B2 | 11/2005 | Hotti et al. | |
| 6,978,379 B1 | 12/2005 | Goh et al. | |
| 6,985,915 B2 | 1/2006 | Somalwar et al. | |
| 6,988,138 B1 | 1/2006 | Alcorn et al. | |
| 7,003,578 B2 | 2/2006 | Kanada et al. | |
| 7,035,879 B2 | 4/2006 | Shi et al. | |
| 7,035,944 B2 | 4/2006 | Fletcher et al. | |
| 7,047,522 B1 | 5/2006 | Dixon et al. | |
| 7,054,910 B1 | 5/2006 | Nordin et al. | |
| 7,062,490 B2 | 6/2006 | Adya et al. | |
| 7,062,511 B1 | 6/2006 | Poulsen | |
| 7,080,000 B1 | 7/2006 | Cambridge | |
| 7,089,584 B1 | 8/2006 | Sharma | |
| 7,093,261 B1 | 8/2006 | Harper et al. | |
| 7,093,283 B1 | 8/2006 | Chen et al. | |
| 7,124,413 B1 | 10/2006 | Klemm et al. | |
| 7,174,563 B1 | 2/2007 | Brownlie et al. | |
| 7,185,192 B1 * | 2/2007 | Kahn | 713/155 |
| 7,219,140 B2 | 5/2007 | Marl et al. | |
| 7,272,625 B1 | 9/2007 | Hannel et al. | |
| 2001/0009016 A1 | 7/2001 | Hofmann et al. | |
| 2001/0034771 A1 | 10/2001 | Hutsch et al. | |
| 2001/0039586 A1 | 11/2001 | Primak et al. | |
| 2001/0047485 A1 * | 11/2001 | Brown et al. | 713/201 |
| 2002/0005867 A1 | 1/2002 | Gvily | |
| 2002/0029296 A1 | 3/2002 | Anuff et al. | |
| 2002/0059394 A1 | 5/2002 | Sanders | |
| 2002/0062451 A1 | 5/2002 | Scheidt et al. | |
| 2002/0067370 A1 | 6/2002 | Forney | |
| 2002/0069261 A1 | 6/2002 | Bellare et al. | 709/218 |
| 2002/0087571 A1 | 7/2002 | Stapel et al. | |
| 2002/0103818 A1 | 8/2002 | Amberden | |
| 2002/0104071 A1 | 8/2002 | Charisius et al. | |
| 2002/0107913 A1 | 8/2002 | Rivera et al. | 709/203 |
| 2002/0107920 A1 | 8/2002 | Hotti | |
| 2002/0111998 A1 | 8/2002 | Kim | |
| 2002/0120685 A1 | 8/2002 | Srivastava et al. | |
| 2002/0124053 A1 | 9/2002 | Adams et al. | |
| 2002/0135617 A1 | 9/2002 | Samid | |
| 2002/0143819 A1 | 10/2002 | Han et al. | |
| 2002/0147801 A1 * | 10/2002 | Gullotta et al. | 709/223 |
| 2002/0152279 A1 | 10/2002 | Sollenberger et al. | |
| 2002/0161903 A1 | 10/2002 | Besaw | |
| 2002/0169893 A1 | 11/2002 | Chen et al. | |
| 2002/0169975 A1 | 11/2002 | Good | |
| 2002/0173971 A1 | 11/2002 | Stirpe et al. | 705/1 |
| 2002/0178119 A1 * | 11/2002 | Griffin et al. | 705/54 |
| 2002/0188869 A1 * | 12/2002 | Patrick | 713/201 |
| 2002/0194267 A1 | 12/2002 | Flesner et al. | |
| 2003/0014442 A1 | 1/2003 | Shiigi et al. | |
| 2003/0046576 A1 * | 3/2003 | High et al. | 713/200 |
| 2003/0065721 A1 | 4/2003 | Roskind | |
| 2003/0069874 A1 | 4/2003 | Hertzog et al. | |
| 2003/0078959 A1 | 4/2003 | Yeung et al. | |
| 2003/0078972 A1 | 4/2003 | Tapissier et al. | |
| 2003/0088617 A1 | 5/2003 | Clark et al. | |
| 2003/0110448 A1 | 6/2003 | Haut et al. | |
| 2003/0115484 A1 | 6/2003 | Moriconi et al. | |
| 2003/0120686 A1 | 6/2003 | Kim et al. | |
| 2003/0126236 A1 | 7/2003 | Marl et al. | |
| 2003/0126558 A1 | 7/2003 | Griffin | |
| 2003/0131113 A1 | 7/2003 | Reeves et al. | 709/229 |
| 2003/0140308 A1 | 7/2003 | Murthy et al. | |
| 2003/0146937 A1 | 8/2003 | Lee | |
| 2003/0167315 A1 | 9/2003 | Chowdhry et al. | |
| 2003/0167455 A1 | 9/2003 | Iborra et al. | |
| 2003/0182577 A1 | 9/2003 | Mocek | |
| 2003/0187956 A1 | 10/2003 | Belt et al. | |
| 2003/0200350 A1 | 10/2003 | Kumar et al. | |
| 2003/0204481 A1 | 10/2003 | Lau | |
| 2003/0212766 A1 | 11/2003 | Giles et al. | |
| 2003/0216938 A1 | 11/2003 | Shour | |
| 2003/0220963 A1 | 11/2003 | Golovinsky et al. | |
| 2003/0229501 A1 | 12/2003 | Copeland et al. | |
| 2003/0229623 A1 | 12/2003 | Chang et al. | 707/3 |
| 2004/0003071 A1 | 1/2004 | Mathew et al. | |
| 2004/0010719 A1 | 1/2004 | Daenen | |
| 2004/0019650 A1 | 1/2004 | Auvenshine | |
| 2004/0024812 A1 | 2/2004 | Park et al. | |
| 2004/0030744 A1 | 2/2004 | Rubin et al. | |
| 2004/0030795 A1 | 2/2004 | Hesmer et al. | |
| 2004/0078371 A1 | 4/2004 | Worrall et al. | |
| 2004/0098467 A1 | 5/2004 | Dewey et al. | |
| 2004/0098606 A1 | 5/2004 | Tan et al. | |
| 2004/0107360 A1 | 6/2004 | Herrmann et al. | |
| 2004/0162905 A1 | 8/2004 | Griffin et al. | |
| 2004/0167880 A1 | 8/2004 | Smith | |
| 2004/0205473 A1 | 10/2004 | Fisher et al. | 715/500 |
| 2004/0205557 A1 | 10/2004 | Bahrs et al. | 715/513 |
| 2004/0215650 A1 | 10/2004 | Shaji et al. | |
| 2004/0230546 A1 | 11/2004 | Rogers | |
| 2004/0236760 A1 | 11/2004 | Arkeketa et al. | |
| 2005/0021502 A1 | 1/2005 | Chen et al. | |
| 2005/0021656 A1 | 1/2005 | Callegari | |
| 2005/0050184 A1 | 3/2005 | Boden et al. | |
| 2005/0060324 A1 | 3/2005 | Johnson et al. | |
| 2005/0097008 A1 | 5/2005 | Ehring et al. | |
| 2005/0198617 A1 | 9/2005 | Kim et al. | |
| 2005/0256894 A1 | 11/2005 | Talanis et al. | |
| 2005/0257267 A1 | 11/2005 | Williams et al. | |
| 2006/0059107 A1 | 3/2006 | Elmore et al. | |
| 2006/0085412 A1 | 4/2006 | Johnson et al. | |
| 2006/0167858 A1 | 7/2006 | Dennis et al. | |

FOREIGN PATENT DOCUMENTS

| | | |
|---|---|---|
| EP | 1 256 889 | 11/2002 |
| WO | WO 0038978 | 6/2000 |
| WO | WO 0114962 | 3/2001 |
| WO | WO 01/67285 | 9/2001 |
| WO | WO 01/77823 A1 | 10/2001 |

WO    WO 02/063496 A2    8/2002

OTHER PUBLICATIONS

Hayton, R.J. et al. "Access Control in an Open Distributed Environment", 1998.*
Bertino, Elisa et al. "TRBAC: A temporal role-based access control model", ACM Transactions on Information and System Security (TISSEC), vol. 4, Issue 3 (Aug. 2001).*
Sandhu, Ravi S. et al. "Role-Based Access Control Models", IEEE Computer, vol. 29, No. 2, Feb. 1996.*
Covington, Michael J. et al. "Securing context-aware applications using environment roles", ACM Workshop on Role Based Access Control, Proceedings of the sixth ACM symposium on Access control models and technologies, 2001.*
Yao, Walt et al. "A model of OASIS role-based access control and its support for active security", ACM Workshop on Role Based Control, Proceedings of the sixth ACM symposium on Access control models and technologies, 2001.*
Georgiadis, Christos K. et al. "Flexible team-based access control using contexts", ACM Workshop on Role Based Access Control, Proceedings of the sixth ACM symposium on Access control models and technologies, 2001.*
Tzelepi, Sofia K. et al. "A flexible content and context-based access control model for multimedia medical image database systems", International Multimedia Conference, Proceedings of the 2001 workshop on Multimedia and security: new challenges, Oct. 5, 2001.*
Goh, Chen et al. "Towards a more complete model of role", Symposium on Access Control Models and Technologies, Proceedings of the third ACM workshop on Role-based access control, 1998.*
Ahn, Gail-Joon, Michael E. Shin: Role-Based Authorization Constraints Specification Using Object Constraint Language. WETICE 2001: 157-162.*
Faden, Glenn: RBAC in UNIX Administration. ACM Workshop on Role-Based Access Control 1999: 95-101.*
Gustafsson, Mats, Benoit Deligny, Nahid Shahmehri: Using NFS to Implement Role-Based Access Control. WETICE 1997: 299-304.*
Joshi, James, Walid G. Aref, Arif Ghafoor, Eugene H. Spafford: Security models for web-based applications. Commun. ACM 44(2): 38-44 (2001).*
Na, SangYeob, SuhHyun Cheon: Role delegation in role-based access control. ACM Workshop on Role-Based Access Control 2000: 39-44.*
Oh, Sejong, Seog Park: Enterprise Model as a Basis of Administration on Role-Based Access Control. CODAS 2001: 150-158.*
Park, Joon S., Ravi S. Sandhu, Gail-Joon Ahn: Role-based access control on the web. ACM Trans. Inf. Syst. Secur. 4(1):37-71 (2001).*
Porwal, Priyank. "Automating Optimistic Access Control Systems", date unknown.*
Povey, Dean. "Optimistic Security: A New Access Control Paradigm", (1999).*
Sandhu, Ravi S., Venkata Bhamidipati, Qamar Munawer: The ARBAC97 Model for Role-Based Administration of Roles. ACM Trans. Inf. Syst. Secur. 2(1): 105-135 (1999).*
Sandhu, Ravi S., Qamar Munawer: The RRA97 Model for Role-Based Administration of Role Hierarchies. ACSAC 1998: 39-49.*
Sandhu, Ravi S., Edward J. Coyne, Hal L. Feinstein, Charles E. Youman: Role-Based Access Control Models. IEEE Computer 29(2): 38-47 (1996).*
Shim, Won Bo, Seog Park: Implementing Web Access Control System for the Multiple Web Servers in the Same Domain Using RBAC Concept. ICPADS 2001: 768-773.*
International Search Report, PCT/US04/04078, Dec. 15, 2005, 3 sheets.
International Search Report, PCT/US04/04140, Dec. 27, 2005, 3 sheets.
US DataCenters . . . eBusiness, Business Wire, p. 2079, Apr. 4, 2001.
Hunter, Jason, "Java Servlet Programming", second edition, O'Reilly, Apr. 11, 2001.
Eiji Okamoto, "Proposal for Integrated Security Systems", Jun. 1992, IEEE Computer Society Press, p. 354-358.
http://java.sun.com/products/ejb/ (last visit: Dec. 7, 2004).
http://www.javaworld.com/jw-12-2002/jw-1207-yesnoejb_p.html (last visit: Dec. 7, 2004).
Sundsted, Todd, "JNDI Overview, Part 1: An Introduction to Naming Services", JavaWorld, Jan. 2000. pp. 1-6, (downloaded from: www.javaworld.com/javaworld/jw-01-2000/jw-01-howto_p.html).
Moore, Bill, et al., "Migrating Weblogic Applications to WebSphere Advanced Edition", IBM Redbooks, Jan. 2001, pp. 1, 3-4, 109-111 and 181-195.
Barrett, Alexandra, "Trying Out Transactions", SunExpert Magazine, Jan. 1999, pp. 57-59.
Ayers, Danny, et al., Professional Java Server Programming, Wrox Press, Ltd., Birmingham, UK, Dec. 1999, pp. 515-545.
Ford, Nigel, Web Developer.com Guide to Building Intelligent Web Sites with JavaScript, Wiley Computer Publishing, NY, NY © 1998, pp. 65-86, 96-98, 101-102, 245-250 and 324-327.
Microsoft Computer Dictionary, 4th Edition, Microsoft Press, Redmond, WA, © 1999, p. 489.
U.S. Appl. No. 10/279,449, filed Oct. 24, 2002, Philip B. Griffin.
U.S. Appl. No. 10/279,450, filed Oct. 24, 2002, Daniel Selman et al.
U.S. Appl. No. 10/279,542, filed Oct. 24, 2002, Thomas A. Cook et al.
U.S. Appl. No. 10/279,543, filed Oct. 24, 2002, Philip B. Griffin et al.
U.S. Appl. No. 10/279,663, filed Oct. 24, 2002, John Haut et al.
U.S. Appl. No. 10/279,696, filed Oct. 24, 2002, Shelly Qian et al.
U.S. Appl. No. 10/279,951, filed Oct. 24, 2002, Chris Jolley et al.
Moran, D.B., et al. "Multimodal User Interfaces in the Open Agent Architecture," ACM 0-89791-839-8/96/01, IUI 97, Orlando Florida USA (1997) pp. 61-68.
Rouff, C., "Formal Specification of User Interfaces," *SIGCHI Bulletin* vol. 28, No. 3 (Jul. 1996) pp. 27-33.
"Guide to Using the BEA E-Business Control Center," *BEAWebLogic Portal*, Version 4.0 (Oct. 2001) 356 pages.
International Search Report, PCT/US02/34048, Dec. 23, 2002, 2 sheets.
International Search Report, PCT/US02/34008, Dec. 31, 2002, 5 sheets.
International Search Report, PCT/US02/34006, Jan. 13, 2003, 3 sheets.
International Search Report, PCT/US02/34007, Jan. 21, 2003, 3 sheets.
International Search Report, PCT/US02/34089, Feb. 10, 2003, 4 sheets.
International Search Report, PCT/US02/34309, Feb. 14, 2003, 4 sheets.
International Search Report, PCT/US02/34308, Mar. 5, 2003, 4 sheets.
International Search Report, PCT/US02/34088, Mar. 7, 2003, 3 sheets.
Browne et al., Location-Independent Naming for Virtual Distributed Software Repositories, http://portal.acm.org/dl.cfm, ACM Symposium on Software Reusability, Seattle, WA, USA, Aug. 1995, vol. 20, Issue SI, pp. 179-185.
Catley et al., Design of a Health Care Architecture for Medical Data Interoperability and Application Integration, Proceedings of the Second Joint EMBS/BMES Conference, Houston, TX, Oct. 23-26, 2002, IEEE, vol. 3, pp. 1952-1953.
Candan, K.S. et al., Enabling Dynamic Content Caching for Database-Driven Web Sites, Proceedings of the 2001 ACM SIGMOD International Conference on Management of Data, May 21-24, 2001, Santa Barbara, California, pp. 532-554.
Parker, Elizabeth, The Complete Idiot's Guide to Microsoft FrontPage 2000, 1999, Que, pp. 7 and 55.
Rossi, Gustavo et al., Designing Personalized Web Applications, ACM, WWW10, Hong Kong, May 1-5, 2001, pp. 275-284.
Adomavicius, Gediminas, et al., "User Profiling in Personalization Applications Through Rule Discovery and Validation", KDD '99, San Diego, CA, © ACM 1999, pp. 377-381.
Adya, Atul, et al., "FARSITE: Federated, Available and Reliable Storage for an Incompletely Trusted Environment", ACM SIGOPS Operating Systems Review, vol. 36, Issue SI, OSDI '02: Proceedings of the 5th Symposium on Operating Systems Design and Implementation, pp. 1-14 (Winter 2002).

Atkins, D.L., et al., "Mawl: A Domain-Specific Language for Form-Based Services", IEEE Transactions on Software Engineering, IEEE Service Center, Los Alamitos, CA, US, vol. 25, No. 3, pp. 334-346 (May 1999).

Cingil, Ibrahim, et al., " A Broader Approach to Personalization", Communications of the ACM, vol. 43, No. 6, pp. 136-141 (Aug. 2000).

Freudenthal, Eric, et al. "dRBAC: Distributed Role-Based Access Control for Dynamic Coalition Environments", Proceedings of the 22nd International Conference on Distributed Computing Systems (ICDCS '02) IEEE 2002, 10 pages.

Kistler, T., et al., "WebL—a programming language for the Web", Computer Networks and ISDN Systems, North Holland Publishing, Amsterdam, NL, vol. 30, No. 1-7, pp. 259-270 (Apr. 1998).

Levy, M.R., "Web Programming in Guide", Software Practice & Experience, Wiley & Sons, Bognor Regis, GB, vol. 28, No. 15, pp. 1581-1603 (Dec. 25, 1998).

Stephanidis, Constantine, et al., "Decision Making in Intelligent User Interfaces", IUI '97, Orlando, FL, © ACM 1997, pp. 195-202.

Stiemerling, Oliver, et al., "How to Make Software Softer—Designing Tailorable Applications", DIS '97, Amsterdam, The Netherlands, © ACM 1997, pp. 365-376.

Symborski, Carl W., "Updating Software and Configuration Data in a Distributed Communications Network"; IEEE Computer Networking Symposium, Proceedings of the IEEE Computer Society, Washington, D.C., Apr. 11-13, 1988, pp. 331-338.

Zhang, Zheng, et al., "Designing a Robust Namespace for Distributed File Services", IEEE Proceedings of the 20th Symposium on Reliable Distributed Systems, New Orleans, Louisiana, Oct. 28-31, 2001, pp. 162-171.

Supplementary European Search Report for EP 02773915.0 dated Oct. 12, 2006, 3 pages.

Supplementary European Search Report for EP 01975484.5 dated Dec. 19, 2006, 2 pages.

Tanyi, Emmanuel, Easy XML, Mar. 6, 2000, www.winsite.com, pp. 1-6.

Method and System for Visually Constructing Document Type Definitions and Related Artifacts Using a Reusable Object Model, IBM Technical Disclosure Bulletin, copyright IP.com, Inc., May 23, 2001, 3 pages.

http://portal.acm.org/citation.cfm?id=1011436, p. 1, last visited: Oct. 24, 2007.

Koved et al., "Security Challenges for Enterprise Java in an e-Business Environment," pp. 130-152, IBM Systems Journal, vol. 40, No. 1, Jan. 2001.

Microsoft Windows ("Windows Explorer") copyright 1981-2001, 3 pages.

* cited by examiner

SYSTEM AND METHOD FOR RULE-BASED ENTITLEMENTS

CLAIM OF PRIORITY

This application claims priority from ENHANCED PORTALS [FLAGSTAFF RELEASE], U.S. Provisional Application No. 60/386,487, Inventors: Phil Griffin, et al., filed on Oct. 24, 2001, and which is incorporated herein by reference.

CROSS REFERENCES

This application is related to the following applications which are hereby incorporated by reference in their entirety: SYSTEM AND METHOD FOR SERVER SECURITY AND ENTITLEMENT PROCESSING, U.S. application Ser. No. 09/878,536, Inventor: Paul Patrick, filed on Jun. 11, 2001; and SYSTEM AND METHOD FOR DELEGATED ADMINISTRATION, U.S. application Ser. No. 10/279,543, Inventors: Phil Griffin, et al., filed on Oct. 24, 2002.

This application is related to the following publications which are hereby incorporated by reference in their entirety: BEA WebLogic Portal™: Guide to Using the BEA E-Business Control Center (Version 4.0).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to the field of user authorization and in particular, role-based entitlements.

BACKGROUND

Computer authorization systems are typically permission-based. Once a user is authorized, usually by entering a password, the user is assigned a fixed set of permissions that govern the user's access to resources in an enterprise application. For example, a user may have permission to modify computer files belonging to the accounting department, but not the human resources department. A user's role in an organization will change over time, however, as the user acquires new skills and responsibilities. Access to resources should be tailored to each user's particular circumstances. Accordingly, a user's permissions need to be modified in order to reflect new privileges. When the number of users is great, administering fine-grained details of each individual user's permissions can create significant administrative overhead. As a result, a user's static permissions may not change in step with the user's role in an organization. This problem is exacerbated if privileges are dependent on less tangible factors, such as the time of day or prevailing conditions of a computer network. What is needed is a flexible, rules-based approach to authorization that allows users to dynamically acquire different privileges as their roles change over time.

DETAILED DESCRIPTION

Figure 1:
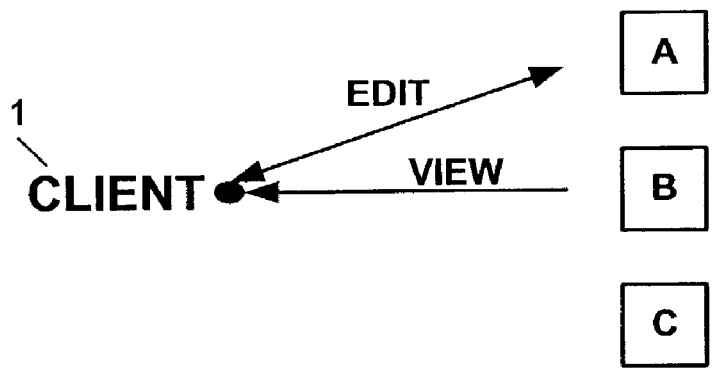
FIG. 1 is an illustration of a static authorization scheme.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In one embodiment, a resource operation request is sent from a client process (or client) to resource process (or resource). A client can be a task or process through which a user interacts with a resource (e.g., a web browser), or it may simply be an autonomous task or process. A resource is any part of a computer network that can be assigned permissions. For example, a resource can be data, a file, a database, a portion of a database, an object, an operating system resource, an administrative task, a graphical user interface, a process, a thread, a Java™ application, a Java™ applet, a Java™ servlet, or a Java™ Enterprise Bean. Java™ is an objected-oriented programming language and run-time environment available from Sun Microsystems, Inc. of Palo Alto, Calif. An access control mechanism intercepts the resource operation sent by the client to the resource and determines if it is permitted based on the client's entitlements. An entitlement is a business rule that grants or denies access to a resource. In one embodiment, determination of entitlements consists of dynamically associating roles with the client based on rules that take into account information about the client, information about the client's communication session, or the current state of the system. Roles are used to determine which operations the client is permitted to perform on a resource. In one embodiment, if one of the permitted operations matches the requested operation, the client is entitled to perform that operation.

In another embodiment, resources can be associated with portals. A portal is a feature-rich web site. It provides a point of access to enterprise data and applications, presenting a unified and personalized view of that information to employees, customers and business partners. Portals allow multiple web applications within a single web interface. In addition to regular web content that appears in a portal (e.g., text or graphics), portals provide the ability to display portlets—self-contained applications or content—all in a single web interface. Portals also support multiple pages with tab-based navigation, with each page containing its own content and portlets. One such system is the WebLogic Portal™, available from BEA Systems, Inc. of San Jose, Calif.

In one embodiment, clients can belong to one or more portal groups. Roles are used to dynamically determine which portal groups a client belongs to. Portal groups provide a means for organizing users with common characteristics into a single category. Portal groups also allow for the definition of different views of a portal for different portal groups, making it seem as if users in each group are looking at completely different web sites.

FIG. 1 is an illustration of an authorization scheme which utilizes static permissions. Client 1 can access resources A-C according to a fixed set of permissions. For example, resources A-C could be individual portlets on a single portal page. As illustrated in FIG. 1, client 1 can edit resource A, but can only view resource B, and has no access to resource C.

Figure 2A:
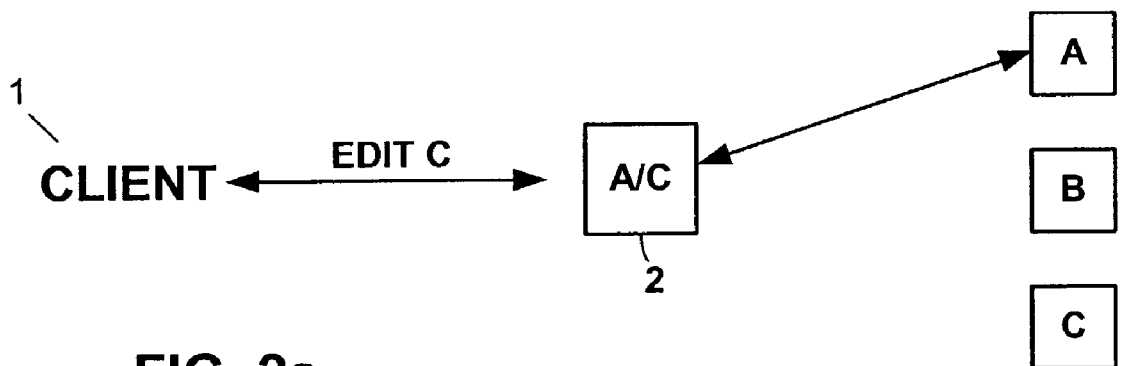
FIG. 2a is an illustration of a dynamic authorization scheme in accordance to one embodiment of the invention.

FIG. 2a is an illustration of an authorization scheme in accordance with one embodiment of the invention. In FIG. 2a, client 1 attempts to edit resource C. The edit operation is intercepted by process 2 which dynamically determines, at that point in time, what resources client 1 may edit. Client 1 is then given permission to edit only those resources. In the current state of the system, client 1 can only edit resource A. Therefore, the edit operation fails.

Figure 2B:
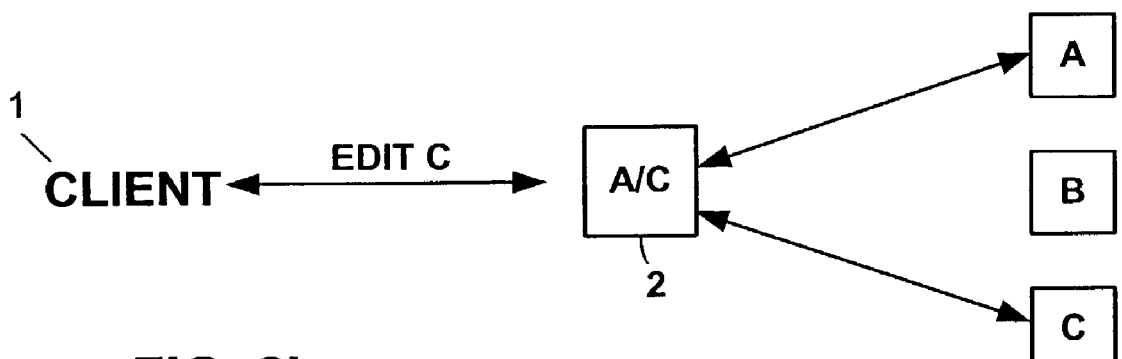
FIG. 2b is the dynamic authorization scheme of FIG. 2a in a different state.

FIG. 2b is the authorization scheme of FIG. 2a in a different state. Again, client 1 attempts to edit resource C. The system is now in a different state and process 2 dynamically determines that client 1 can edit resources A and C, but not B. Therefore, the edit operation succeeds.

In one embodiment, to perform an operation on a resource, a client must be entitled to do so. An entitlement in one embodiment is a set of attributes: resource, role, capability, and permission. Given a resource, a role and a capability, a client can perform an operation on the resource corresponding to the capability if the permission allows it. Entitlements can be stored in database and retrieved or queried based on any of their attributes. In one embodiment, an administrative task can involve creating, removing, or modifying information pertaining to users in a system; creating, removing, or modifying attributes of portlets and portal pages; or altering the appearance and behavior of portlets and portal pages. In another embodiment, resource names can be organized in a taxonomy. A taxonomy provides a means of categorizing and uniquely identifying a resource and is hierarchical in nature. For example, a stock quote portlet "Quote" on the "web" portal page could be:

(1) myPortal/stockBroker/quotePortlet

In example (1), "myPortal" is the top level taxonomy name and serves to indicate that the resource is a portal named "myPortal". The next part of the resource name, "stockBroker", identifies a portal group within the portal "myPortal" consisting of stockbrokers. The third part of the resource name indicates a portlet "quotePortlet" for the portal group "stockBroker". Thus, the resource name in (1) identifies a portlet "quotePortlet" within the portal group "stockbroker" and within portal "myPortal".

In yet another embodiment, resources can be organized into resource groups wherein a single resource group name can represent a collection of resources. An entitlement specifying a resource group, rather than a single resource, can be extended such that the capability and permission attributes would apply to all resources referred to by the resource group name. If a resource operation specifies a resource rather than a resource group, the resource can be mapped to a resource group before determining which entitlements are applicable to the operation. Resource group names could likewise be organized in a taxonomy.

In one embodiment, a role is defined in terms of a rule comprised of one or more logical expressions. In another embodiment, a role rule can be based on evaluation of predicates. A predicate is a rule that evaluates to true or false. By way of a non-limiting example, predicates may include other predicates, logical operators (e.g., AND, NOT and OR), mathematical operations, method calls, calls to external systems, function calls, etc. In another embodiment, rules can be specified in plain English. For example:

(2) When all of these conditions apply, the client is an
    ExperiencedJavaDeveloper:
        Developer is equal to true
        Skill level is equal to 'High'
        Preferred language is equal to 'Java'

In example (2) above, the role that is being determined is "ExperiencedJavaDeveloper". The predicate "Developer" may evaluate to true when, for instance, information contained in a user profile indicates that the client is a user in the software development department of an organization. Likewise, the other predicates ("Skill level", "Preferred language") could similarly be evaluated using information from the user profile. In another embodiment, the predicate can be based on the evaluation of information about a client's session (e.g., the state of communication between the client and other processes in the system). In yet another embodiment, session information can include information about a client's pattern of interaction with a graphical user interface, such as a portlet. It will be apparent to those skilled in the art that a predicate can be based on any information, whether the information is associated with a particular client or not. For example:

(3) When all of these conditions apply, the client is a SystemAdministrator:
    TimeofDay is between 12:00am and 7:00am
    SystemLoad is 'Low'
    AdminSkillLevel is at least 5

In example (3), two predicates ("TimeofDay" and "SystemLoad") are based on information unrelated to a particular client. In this example, a client is allowed to be a system administrator if it is the middle of the night, the system is not busy, and the client has level 5 administration skills.

In one embodiment, an entitlement's capability is a operation that can be performed for a given role and on a given resource. For example, if the resource is a portlet, the capability can be "show", "edit", or "remove". These operations control whether the portlet is initially displayed for the client ("show"), whether the client can edit information displayed in the portlet ("edit"), and whether the client can hide a portlet window ("remove"). It will be apparent to one skilled in the art that the capability can be any that is feasible for a given resource. An entitlement's permission corresponds to the capability and indicates whether the capability for the given resource and role is granted, denied or abstained. If the permission is granted, the operation should be permitted on the resource. If the permission is denied, the operation should not be permitted. Finally, if the permission is abstain, then the operation is not explicitly granted or denied. It will be apparent to one skilled in the art that other permissions are possible.

Figure 3:
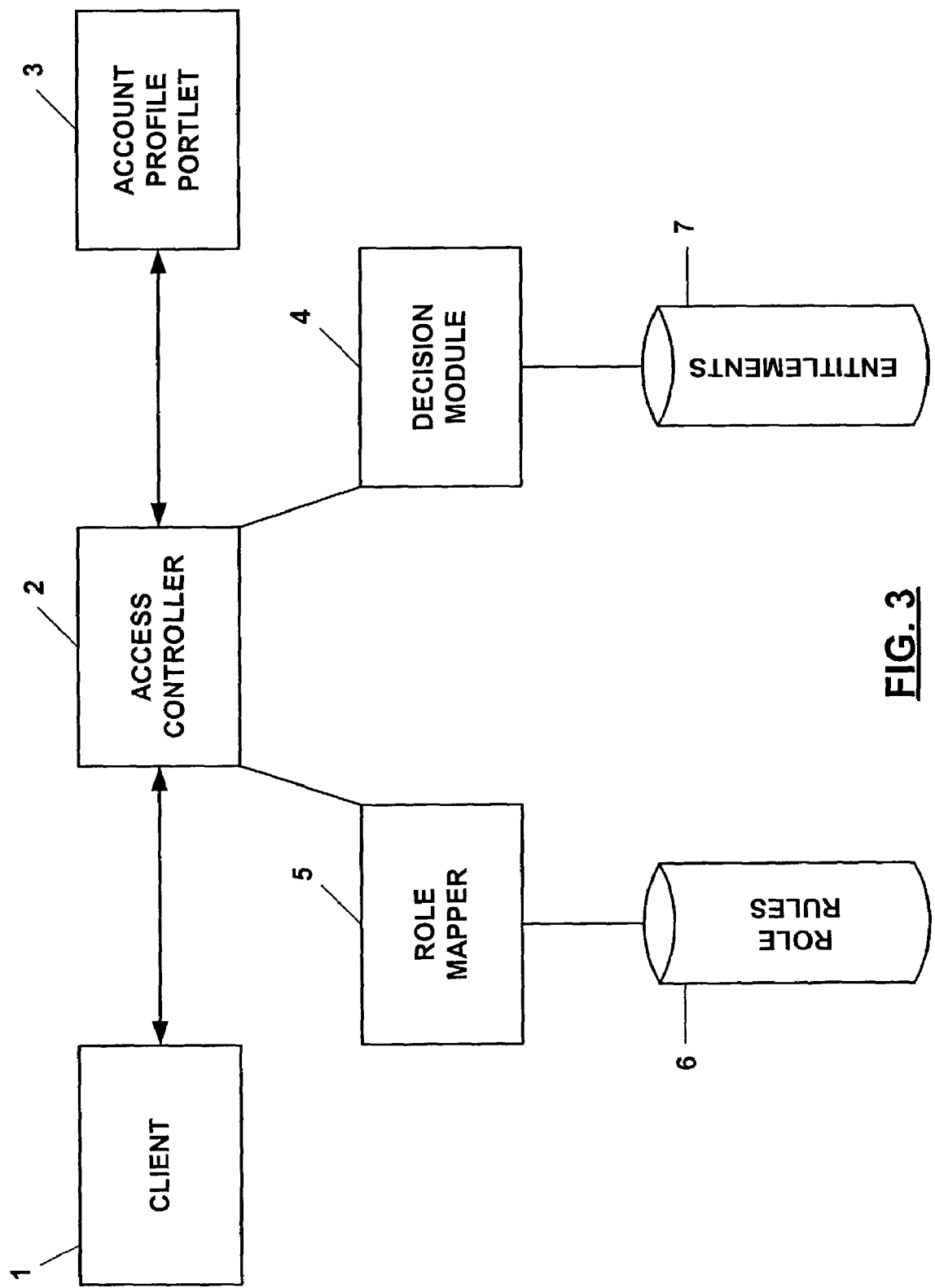
FIG. 3 is a system in accordance to one embodiment of the invention.

FIG. 3 is a system in accordance with one embodiment of the invention. Client 1 initiates a resource operation directed to resource 3. Client 1 could be, for example, a user interacting with a portal in an attempt to edit information displayed in a portlet named "accountProfilePortlet". This assumes that client 1 had permission to view the profile portlet in the first place. The resource operation is intercepted by access controller 2. In one embodiment, the resource operation can contain information about a user (e.g., a user identifier or a user profile, characteristics such as gender and age, etc.). In another embodiment, the resource operation can contain information about the session or a hypertext transfer protocol ("HTTP") request. HTTP request information can pertain to character encoding, remote user, authorization scheme, content length, server port, context path, request URI, request method, scheme, servlet path, content type, remote host, request protocol, locale, server name, remote address, query string, path information, etc. In yet another embodiment, the resource operation can contain any other kind of information relevant to evaluating role rule predicates. Access controller 2 directs role mapper 5 to determine which roles correspond to client 1 at that point in time. Role mapper 5 uses role rules database 6 to dynamically determine which roles apply to the client. If no role is found, a default role of "everyone" is assumed. Suppose, for example, the following roles applied:
  optionTrader
  registeredUser Access controller 2 would then direct the decision module 4 to find entitlements matching the roles and the resource. If one or more entitlements are found, decision module 4 uses the entitlements to determine if the operation is permitted for client 1. For example, assume the decision module found the following entitlements as shown in Table 1:

TABLE 1

| Resource | Role | Capability | Permission |
|---|---|---|---|
| Entitlements | | | |
| accountProfilePortlet | optionTrader | show | grant |
| accountProfilePortlet | optionTrader | edit | grant |
| accountProfilePortlet | registeredUser | edit | deny |
| accountProfilePortlet | optionTrader | show | grant |
| accountProfilePortlet | optionTrader | edit | grant |
| accountProfilePortlet | registeredUser | edit | deny |
| accountProfilePortlet | everyone | show | deny |
| accountProfilePortlet | everyone | edit | deny |

In one embodiment, entitlements that have capabilities compatible with the requested operation are considered. In this case, there is a conflict between two roles. The role optionTrader allows editing of the accountProfilePortlet whereas the role registeredUser does not. (The default "everyone" roles are ignored in this case since other roles have been established.) In one embodiment, decision module 4 employs an optimistic access scheme by logically OR'ing the entitlements and would thus grant permission to edit the portlet. In another embodiment, decision module 4 logically AND's the entitlements and thus would deny permission to edit the portlet. In yet another embodiment, decision module 4 can use heuristics to determine the permission or rely on other modules to make the decision on its behalf.

In one embodiment, performance can be improved through caching techniques. For example, access controller 2 can cache recently determined roles for clients and thereby forgo utilization of role mapper 5. Of course, roles that are dependent on time-sensitive predicates would have to be reevaluated. Alternatively, role mapper 5 can do the same. Cached roles can automatically be removed from the cache through an aging process or when the cache is full. In another embodiment, access controller 2 or decision module 4 can cache recently determined entitlements. In this way, access controller 2 can forego utilizing role mapper 5 and decision module 4 when cached information is considered consistent with role rules and entitlements.

One embodiment maybe implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method of authorization, comprising:
    receiving a resource operation from a client during a session;
    determining, in response to receiving the resource operation from the client, at least one role that applies to the client based on evaluating at least one role rule including at least one predicate and at least one logical operator using information about the client's pattern of interaction with a portlet;
    dynamically associating the at least one role with the client;
    associating at least one entitlement with the at least one role;
    determining whether to permit the resource operation on a resource identified in the resource operation based on the at least one entitlement; and
    wherein evaluating the at least one role rule determines the at least one role.

2. The method of claim 1 wherein:
    the at least one role rule is specified in plain language.

3. The method of claim 1 wherein:
    evaluating the at least one role rule uses user information.

4. The method of claim 1 wherein:
    the at least one role is everyone.

5. The method of claim 1 wherein:
    the resource is one of a portal page, a portlet, and an administrative task.

6. The method of claim 1 wherein:
    the resource operation is one of show, edit and remove.

7. The method of claim 1 wherein:
    the resource is a resource group.

8. The method of claim 1 wherein:
determining whether to permit the resource operation is based on an optimistic access scheme.
9. The method of claim 1 wherein:
determining the at least one role that applies to the client includes retrieving the at least one role from a cache.
10. The method of claim 1 wherein:
associating the at least one entitlement with the at least one role includes retrieving the at least one entitlement from a cache.
11. A method of authorization, comprising:
intercepting a resource operation from a client during a session, the resource operation identifying a resource;
determining, in response to intercepting the resource operation from the client, at least one role that applies to the client based on evaluating at least one role rule including at least one predicate and at least one logical operator using information about the client's pattern of interaction with a portlet;
associating at least one entitlement with the at least one role;
dynamically associating the at least one role with the client;
allowing the resource operation on the resource identified in the resource operation if the resource operation is permitted based on the at least one entitlement; and
wherein evaluating the at least one role rule determines the at least one role.
12. The method of claim 11 wherein:
the at least one role rule is specified in plain language.
13. The method of claim 11 wherein:
evaluating the at least one role rule uses user information.
14. The method of claim 11 wherein:
the at least one role is everyone.
15. The method of claim 11 wherein:
the resource is one of a portal page, a portlet, and an administrative task.
16. The method of claim 11 wherein:
the resource operation is one of show, edit and remove.
17. The method of claim 11 wherein:
the resource is a resource group.
18. The method of claim 11 wherein:
determining whether to permit the resource operation is based on an optimistic access scheme.
19. The method of claim 11 wherein:
determining the at least one role that applies to the client includes retrieving the at least one role from a cache.
20. The method of claim 11 wherein:
associating the at least one entitlement with the at least one role includes retrieving the at least one entitlement from a cache.
21. A method of authorization, comprising:
sending a resource request from a client to an access controller during a session, wherein the access controller associates at least one entitlement with the resource request and at least one role; and
sending an indication of whether the resource request is permitted on a resource identified in the resource request from the access controller to the client based on the at least one entitlement;
wherein associating the at least one entitlement with the resource request and the at least one role includes determining, in response to sending the resource request from the client to the access controller, the at least one role that applies to the client based on evaluating at least one role rule including at least one predicate and at least one logical operator using information about the client's pattern of interaction with a portlet;
wherein associating the at least one entitlement with the resource request further includes dynamically associating the at least one role with the client; and
wherein evaluating the at least one role rule determines the at least one role.
22. The method of claim 21 wherein:
the at least one role rule is specified in plain language.
23. The method of claim 21 wherein:
evaluating the at least one role rule uses user information.
24. The method of claim 21 wherein:
the at least one role is everyone.
25. The method of claim 21 wherein:
the resource is one of a portal page, a portlet, and an administrative task.
26. The method of claim 21 wherein:
the resource request includes a resource operation, wherein the resource operation is one of show, edit and remove.
27. The method of claim 21 wherein:
the resource is a resource group.
28. The method of claim 21 wherein:
determining whether to permit the resource request is based on an optimistic access scheme.
29. The method of claim 21 wherein:
determining the at least one role that applies to the client includes retrieving the at least one role from a cache.
30. The method of claim 21 wherein:
associating the at least one entitlement with the resource request includes retrieving the at least one entitlement from a cache.
31. A system for authorization, comprising:
at least one microprocessor;
an access controller adapted to accept a resource operation from a client during a session;
a role mapper coupled to the access controller, the role mapper adapted to determine, in response to accepting the resource operation from the client, at least one role that applies to the client based on evaluating at least one role rule including at least one predicate and at least one logical operator using information about the client's pattern of interaction with a portlet, and to dynamically associate the at least one role with the client;
a decision module coupled to the access controller, the decision module adapted to associate the at least one role with at least one entitlement and to determine whether access to a resource specified in the resource operation is permitted based upon the at least one role and the at least one entitlement; and
wherein evaluating the at least one role rule determines the at least one role.
32. The system of claim 31 wherein:
the at least one role rule is specified in plain language.
33. The system of claim 31 wherein: evaluating the at least one role rule uses user information.
34. The system of claim 31 wherein:
the at least one role is everyone.
35. The system of claim 31 wherein:
the resource is one of a portal page, a portlet, and an administrative task.
36. The system of claim 31 wherein:
the resource operation is one of show, edit and remove.
37. The system of claim 31 wherein:
the resource is a resource group.
38. The system of claim 31 wherein:
determining whether to permit a resource operation is based on an optimistic access scheme.

39. The system of claim 31 wherein:
determining the at least one role that applies to the client includes retrieving the at least one role from a cache.

40. The system of claim 31 wherein:
the access controller is adapted to associate at least one entitlement with the at least one role; p1 wherein associating the at least one entitlement with the at least one role includes retrieving the at least one entitlement from a cache.

41. A system for authorization, comprising:
at least one microprocessor;
a client adapted to send a resource operation to an access controller during a session;
wherein the access controller is coupled to a role mapper, the role mapper adapted to determine, in response to the client sending the resource operation to the access controller, at least one role that applies to the client based on evaluating at least one role rule including at least one predicate and at least one logical operator using information about the client's pattern of interaction with a portlet, and to dynamically associate the at least one role with the client;
wherein the access controller is coupled to an access decision module, the access decision module adapted to associate the at least one role with at least one entitlement and to determine whether access to a resource specified in the resource operation is permitted based upon the at least one entitlement; and
wherein evaluating the at least one role rule determines the at least one role.

42. The system of claim 41 wherein:
the at least one role rule is specified in plain language.

43. The system of claim 41 wherein: evaluating the at least one role rule uses user information.

44. The system of claim 41 wherein:
the at least one role is everyone.

45. The system of claim 41 wherein:
the resource is one of a portal page, a portlet, and an administrative task.

46. The system of claim 41 wherein:
the resource operation is one of show, edit and remove.

47. The system of claim 41 wherein:
the resource is a resource group.

48. The system of claim 41 wherein:
determining whether to permit access to the resource is based on an optimistic access scheme.

49. The system of claim 41 wherein:
determining the at least one role that applies to the client includes retrieving the at least one role from a cache.

50. The system of claim 41 further comprising wherein:
the access controller is adapted to associate at least one entitlement with the at least one role;
wherein associating the at least one entitlement with the at least one role includes retrieving the at least one entitlement from a cache.

51. A system for authorization, comprising:
at least one microprocessor;
a client;
an access controller adapted to accept a resource operation from the client during a session, wherein the resource operation identifies a resource;
a role mapper coupled to the access controller, adapted to determine, in response to the access controller accepting the resource operation from the client, at least one role that applies to the client based on evaluating at least one role rule including at least one predicate and at least one logical operator using information about the client's pattern of interaction with a portlet, and to dynamically associate the at least one role with the client;
an access decision module coupled to the access controller, the access decision module adapted to associate the at least one role with at least one entitlement, and to determine whether access to a resource specified in the resource operation is permitted based upon the at least one entitlement; and
wherein evaluating the at least one role rule determines the at least one role.

52. The system of claim 51 wherein:
the at least one role rule is specified in plain language.

53. The system of claim 51 wherein: evaluating the at least one role rule uses user information.

54. The system of claim 51 wherein:
the at least one role is everyone.

55. The system of claim 51 wherein:
the resource is one of a portal page, a portlet, and an administrative task.

56. The system of claim 51 wherein:
the resource operation is one of show, edit and remove.

57. The system of claim 51 wherein:
the resource is a resource group.

58. The system of claim 51 wherein:
determining whether to permit access to the resource is based on an optimistic access scheme.

59. The system of claim 51 wherein:
determining the at least one role that applies to the client includes retrieving the at least one role from a cache.

60. The system of claim 51 wherein:
the access controller is adapted to associate at least one entitlement with the at least one role;
wherein associating the at least one entitlement with the at least one role includes retrieving the at least one entitlement from a cache.

61. A system for authorization, comprising:
at least one microprocessor;
a means for sending a resource operation from a client during a session;
a means for determining, in response to sending the resource operation from the client, at least one role that applies the client based on evaluating at least one role rule including at least one predicate and at least one logical operator using information about the client's pattern of interaction with a portlet, and for dynamically associating the at least one role with the client;
a means for associating at least one entitlement with the at least one role;
a means for determining whether to permit a resource operation on a resource identified by the resource operation based on the at least one entitlement; and
wherein evaluating the at least one role rule determines the at least one role.

62. The system of claim 61 wherein:
the at least one role rule is specified in plain language.

63. The system of claim 61 wherein: evaluating the at least one role rule uses user information.

64. The system of claim 61 wherein:
the at least one role is everyone.

65. The system of claim 61 wherein:
the resource is one of a portal page, a portlet, and an administrative task.

66. The system of claim 61 wherein:
the resource operation is one of show, edit and remove.

67. The system of claim 61 wherein:
the resource is a resource group.

68. The system of claim 61 wherein:
determining whether to permit a resource operation is based on an optimistic access scheme.
69. The system of claim 61 wherein:
determining the at least one role that applies to the client includes retrieving the at least one role from a cache.
70. The system of claim 61 wherein:
associating the at least one entitlement with the at least one role includes retrieving the at least one entitlement from a cache.
71. A storage medium having instructions stored thereon that when executed by a processor cause a system to:
send a resource operation from a client during a session;
determine, in response to sending the resource operation from the client, at least one role that applies to the client based on evaluating at least one role rule including at least one predicate and at least one logical operator using information about the client's pattern of interaction with a portlet;
dynamically associate the at least one role with the client;
associate at least one entitlement with the at least one role;
determine whether to permit a resource operation on a resource identified by the resource operation based on the at least one entitlement; and
wherein evaluating the at least one role rule determines the at least one role.
72. The storage medium of claim 71 wherein:
the at least one role rule is specified in plain language.
73. The storage medium of claim 71 wherein: evaluating the at least one role rule uses user information.
74. The storage medium of claim 71 wherein:
the at least one role is everyone.
75. The storage medium of claim 71 wherein:
the resource is one of a portal page, a portlet, and an administrative task.
76. The storage medium of claim 71 wherein:
the resource operation is one of show, edit and remove.
77. The storage medium of claim 71 wherein:
the resource is a resource group.
78. The storage medium of claim 71 wherein:
determining whether to permit the resource operation is based on an optimistic access scheme.
79. The storage medium of claim 71 wherein:
determining the at least one role that applies to the client includes retrieving the at least one role from a cache.
80. The storage medium of claim 71 wherein:
associating the at least one entitlement with the at least one role includes retrieving the at least one entitlement from a cache.

* * * * *

UNITED STATES PATENT AND TRADEMARK OFFICE
CERTIFICATE OF CORRECTION

| | | |
|---|---|---|
| PATENT NO. | : 7,451,477 B2 | Page 1 of 1 |
| APPLICATION NO. | : 10/279564 | |
| DATED | : November 11, 2008 | |
| INVENTOR(S) | : Griffin et al. | |

It is certified that error appears in the above-identified patent and that said Letters Patent is hereby corrected as shown below:

On the title page, item (75), in "Inventors", in column 1, line 3, delete "Cambridge," and insert -- Somerville, --, therefor.

In page 4, in column 1, line 13, after "Based" insert -- Access --.

In column 3, line 46, delete ""stockbroker"" and insert -- "stockBroker" --, therefor.

In column 9, line 6, in Claim 40, after "role;" delete "p1".

In column 9, lines 6-9, in Claim 40, delete "wherein associating the at least one entitlement with the at least one role includes retrieving the at least one entitlement from a cache." and insert the same as a new element of the Claim.

Signed and Sealed this

Twentieth Day of April, 2010

David J. Kappos
*Director of the United States Patent and Trademark Office*